Nov. 26, 1935.  A. D. CARPENTER ET AL  2,021,886
TRAILER CONSTRUCTION
Filed Sept. 13, 1934  2 Sheets-Sheet 1
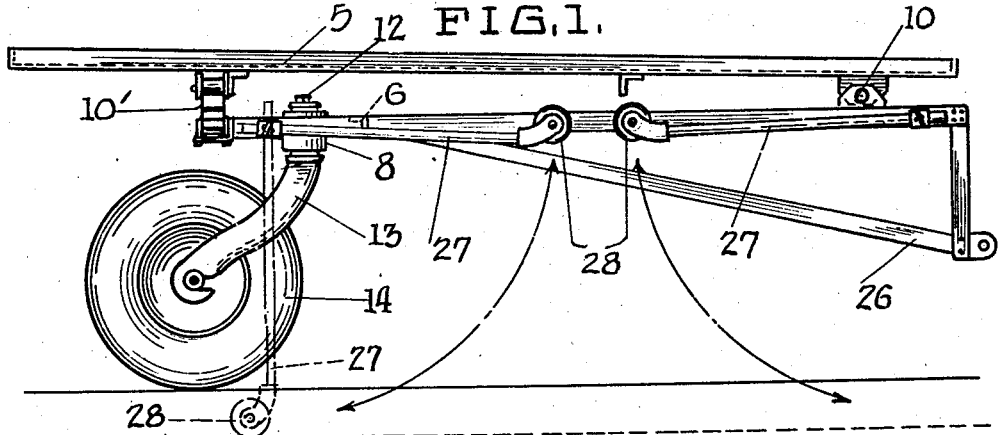
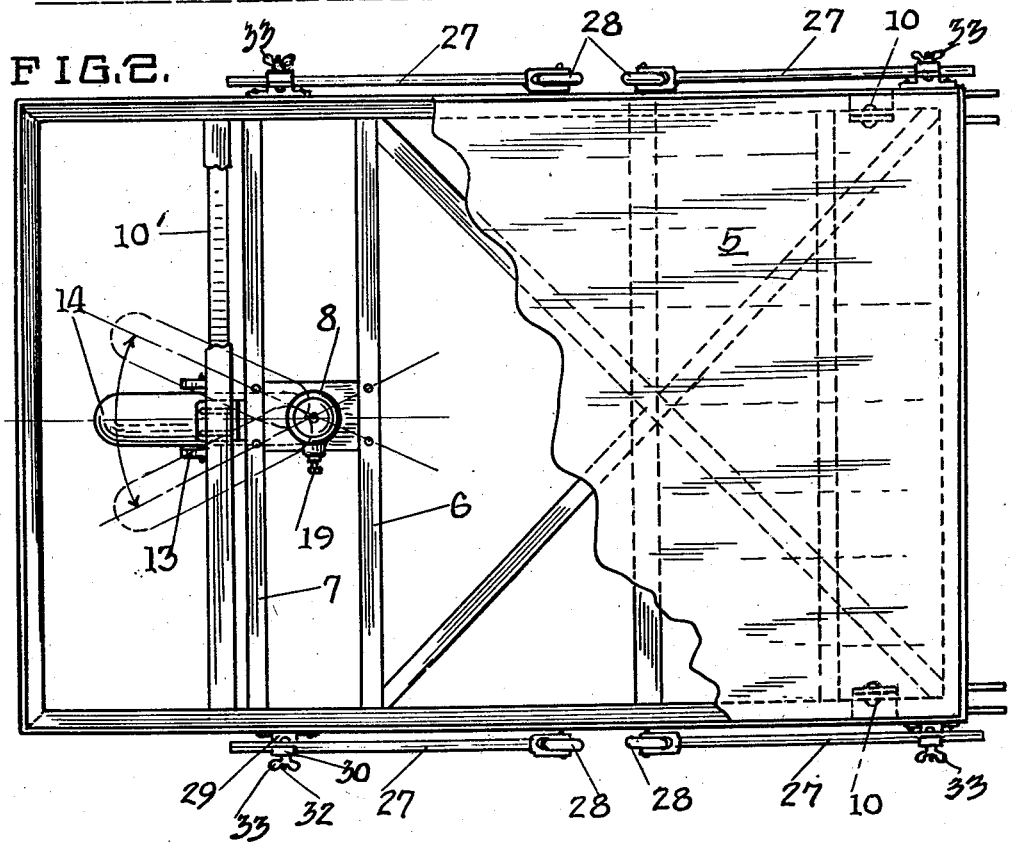
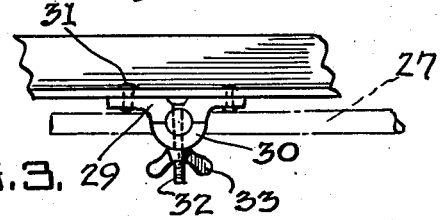
INVENTORS
ARLEY D. CARPENTER
EVERETT KRUG
BY
*Victor J. Evans & Co*
ATTORNEYS.

Nov. 26, 1935.    A. D. CARPENTER ET AL    2,021,886

TRAILER CONSTRUCTION

Filed Sept. 13, 1934    2 Sheets-Sheet 2

INVENTORS
ARLEY D. CARPENTER
EVERETT KRUG
BY
Victor J. Evans & Co
ATTORNEYS.

Patented Nov. 26, 1935

2,021,886

UNITED STATES PATENT OFFICE 2,021,886

TRAILER CONSTRUCTION

Arley D. Carpenter and Everett Krug,
Los Angeles, Calif.

Application September 13, 1934, Serial No. 743,896

4 Claims. (Cl. 188—83)

This invention relates to improvements in trailer mechanism and has particular reference to a trailer for towing behind a motor vehicle and one which will not be subject to excessive side sway.

The principal object of the invention is to provide a trailer having one or more caster wheels which will effectively trail behind a motor vehicle without whipping about, thus endangering the lives of persons travelling on the highway.

A further object is to provide means whereby the trailer may be employed also as a push cart when not attached to the vehicle.

A further object is to provide means for returning the caster wheel to trailing position as quickly as possible.

Other objects and advantages will be apparent during the course of the following description.

In the accompanying drawings forming a part of this specification and in which like numerals are employed to designate like parts throughout the same, Fig. 1 is a side elevation of my trailer, Fig. 2 is a top plan view of Fig. 1, Fig. 3 is an enlarged detail fragmentary view, illustrating one of the trailer supporting leg or rod securing brackets with the leg shown in raised position therein, Fig. 4 is an enlarged top plan view of the caster wheel mounting.

Figure 4:
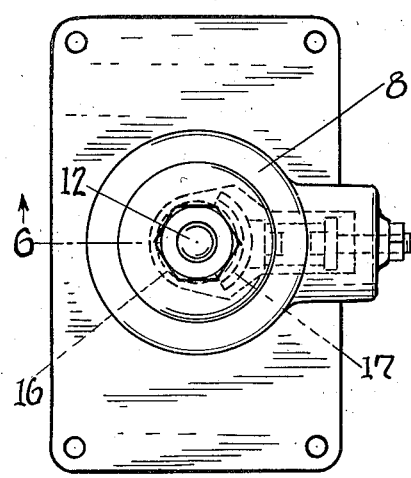
Figure 5:
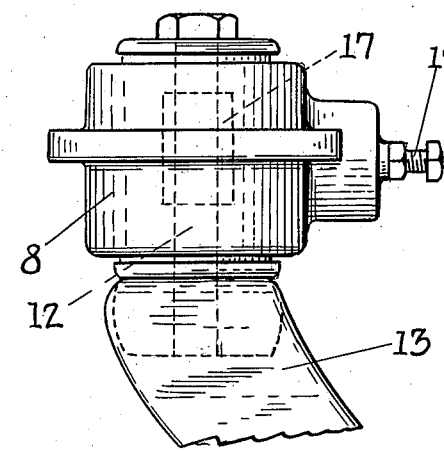
Fig. 5 is a side elevation of Fig. 4.
Figure 6:
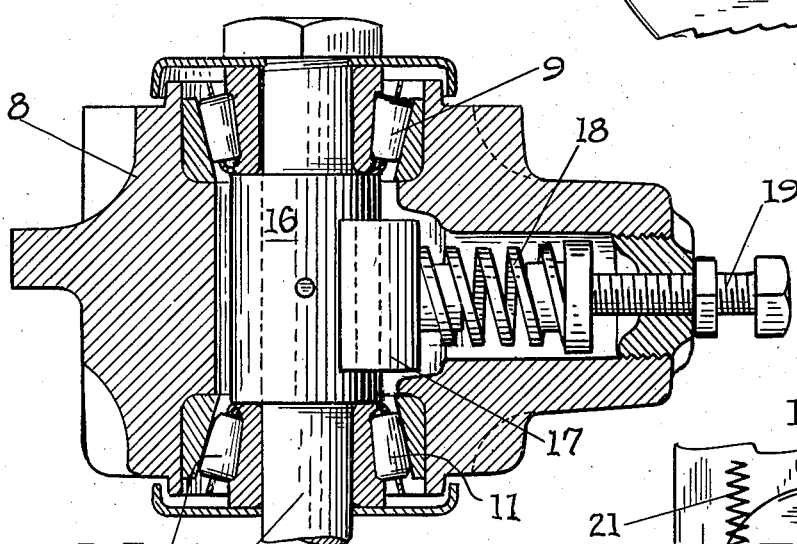
Fig. 6 is an enlarged detail cross sectional view on the line 6—6 of Fig. 4.

It is common knowledge that a caster wheel will track due to its trailing design. However, in view of the fact that the pivot is off center there is a tendency for the trailing wheel to swing from side to side, which results in a thrashing action and if this thrashing action becomes accentuated it may be very dangerous both to the vehicle upon which it is mounted and the pulling vehicle to which it is attached, as well as to other motorists on the highway. Applicant has, therefore, devised an arrangement wherein this thrashing action has been reduced to a point where it will not be objectionable.

In the accompanying drawings wherein for the purpose of illustration is shown a preferred embodiment of my invention, the numeral 5 designates the body of a vehicle such as the platform of a trailer, which is supported upon suitable framework having cross pieces 6 and 7. The body or platform 5 of the vehicle is pivotally attached to the chassis or framework at the pivotal point 10 and the rear end of this platform is resiliently supported relative to the chassis by means of a leaf spring 10', as disclosed in Figs. 1 and 2. Attached to the cross piece is a housing 8 of the caster wheel assembly. This housing has bearings 9 and 11 mounted therein, which bearings support the usual king pin 12 which is affixed to the yoke 13 of a caster wheel 14 which contacts the ground in the usual manner. Mounted upon the upper end of the yoke is a braking element 16 in the form of a sleeve drum, against which a substantially semi-cylindrical brake shoe 17 bears. This brake shoe is forced against the braking surface by a spring 18 extending into a lateral projection formed on the housing, and the spring is compressed through the medium of an adjusting screw 19.

Figure 8:
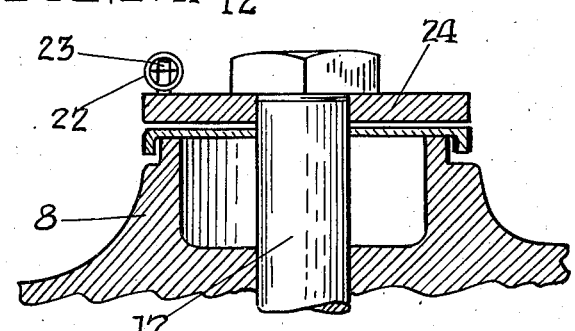
Fig. 8 is a cross sectional view on the line 8—8 of Fig. 7.
Figure 7:
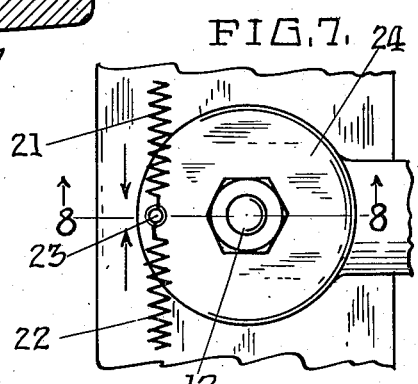
Fig. 7 is a top plan view of a modified form showing the returning springs.

In the modified forms shown in Figs. 7 and 8 the only difference is that a pair of equalizing springs 21 and 22 are attached to a pin 23 and have their opposite ends attached to the frame of the vehicle. This pin 23 is carried upon a disc 24 which is attached to the upper end of the king pin with the result that whenever the yoke tends to turn in its bearing it will always be brought back in a line parallel, or in other words to a straight line position to the direction of travel of the vehicle.

When the vehicle is not being trailed through the draft mechanism 26 it may be disconnected and the legs or rods 27 moved to a vertical or operative position so that the wheels 28 will contact the ground and support the entire structure which will then become a hand-truck which may be rolled about from place to place as best suits the convenience of the owner.

As illustrated in Figures 1, 2, and 3, it will be observed that the rods 27 are mounted in halved castings consisting of bearing members 29 and 30, the members 29 being bolted or otherwise secured to the chassis by means of bolts 31. Pivot bolts 32 extend through these members and said bolts are provided with wing nuts 33, so that the halved bearings 30 will swing with the rods 27 to either the full line or dot and dash line positions shown in Figure 1, when said wing nuts 33 are released and when said rods are swung to the desired position the wing nuts are tightened to hold the rods fixed, as will be apparent.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. In a trailer, a chassis, a caster wheel assembly carried by the chassis and including a housing, a wheel, a yoke for the wheel, a king pin on the yoke and extending through the housing, a brake drum surrounding and fixed to the king pin for disposal in the housing, a brake shoe within the housing and arranged at right angles with respect to the drum, a coil spring for urging the shoe against the drum, and adjusting means for said spring and including a screw threaded through said housing.

2. In a trailer, a chassis, a caster wheel assembly carried by the chassis and including a housing, a wheel, a yoke for said wheel, a king pin on the yoke and extending through the housing, a brake drum surrounding and fixed to the king pin for disposal in the housing, a brake shoe contacting said drum at right angles thereto and shaped to follow the curvature thereof, a coil spring having one end convolution engaging the brake shoe and for urging the latter against the drum, and adjusting means for said spring and including a screw threaded through the housing and receiving the opposite end convolution of the spring.

3. In a trailer, a chassis, a caster wheel assembly carried by the chassis and including a housing, a wheel, a yoke for said wheel, a king pin on the yoke and extending through the housing, a sleeve drum surrounding and fixed to the king pin for disposal in the housing, a substantially semi-cylindrical brake shoe contacting said drum at right angles thereto for following the curvature thereof, a lateral projection formed on the housing, a coil spring arranged in said projection and contacting the brake shoe for urging the latter against the drum, and adjusting means for the spring and including a screw threaded through said housing.

4. In a trailer, a chassis, a caster wheel assembly carried by the chassis and including a housing, a wheel, a yoke for the wheel, a king pin on the yoke and having a braking surface disposed within the housing, a brake shoe within the housing and arranged at right angles with respect to the king pin, a coil spring for urging the shoe against the braking surface, and screw adjusting means for said spring and threaded through the housing.

ARLEY D. CARPENTER.
EVERETT KRUG.